Patented July 10, 1934

1,966,378

UNITED STATES PATENT OFFICE 1,966,378

MECHANISM FOR OPERATING BALING PRESSES

Richard W. Dinzl, Drexel Hill, Pa., assignor to Baldwin-Southwark Corporation, a corporation of Delaware Application August 13, 1932, Serial No. 628,727

7 Claims. (Cl. 78—42)

This invention relates to certain improvements in baling presses of the type used in baling scrap metal, and particularly metal known as tin scrap either before or after the tin has been removed from the body metal. Tin scrap is scrap from which articles have been punched. This metal accumulates in large quantities and the tin after being removed from the base metal is recovered while the base metal is remelted. A baling press is used to compress the loose waste material into a compact bale for shipment. In forming a bale it is necessary to compact a mass of the waste material first by vertical pressure and then by horizontal pressure, and the bale thus formed is discharged from one end of the machine.

In the machine which I will describe later, the previously formed bale is firmly held in position at the end of the final longitudinal compression chamber so as to act as an abutment for a bale which is being formed.

Prior to my invention it was necessary to employ several men to actuate different valves for controlling the different movements of the press.

One object of my invention is to provide a single hand-operated valve which will control the entire mechanism of the press until the finished bale is formed and moved to the position to act as an abutment for a succeeding bundle to be formed into a bale.

A still further object of the invention is to so design the machine that the hand-operated valve will actuate the door which closes the initial pressing chamber while the other valves in succession will be operated by the different movable parts of the apparatus after they have completed their movement.

In the accompanying drawings:

Fig. 2 is a sectional elevation on the line 2—2, Fig. 1a;

Figure 1A:
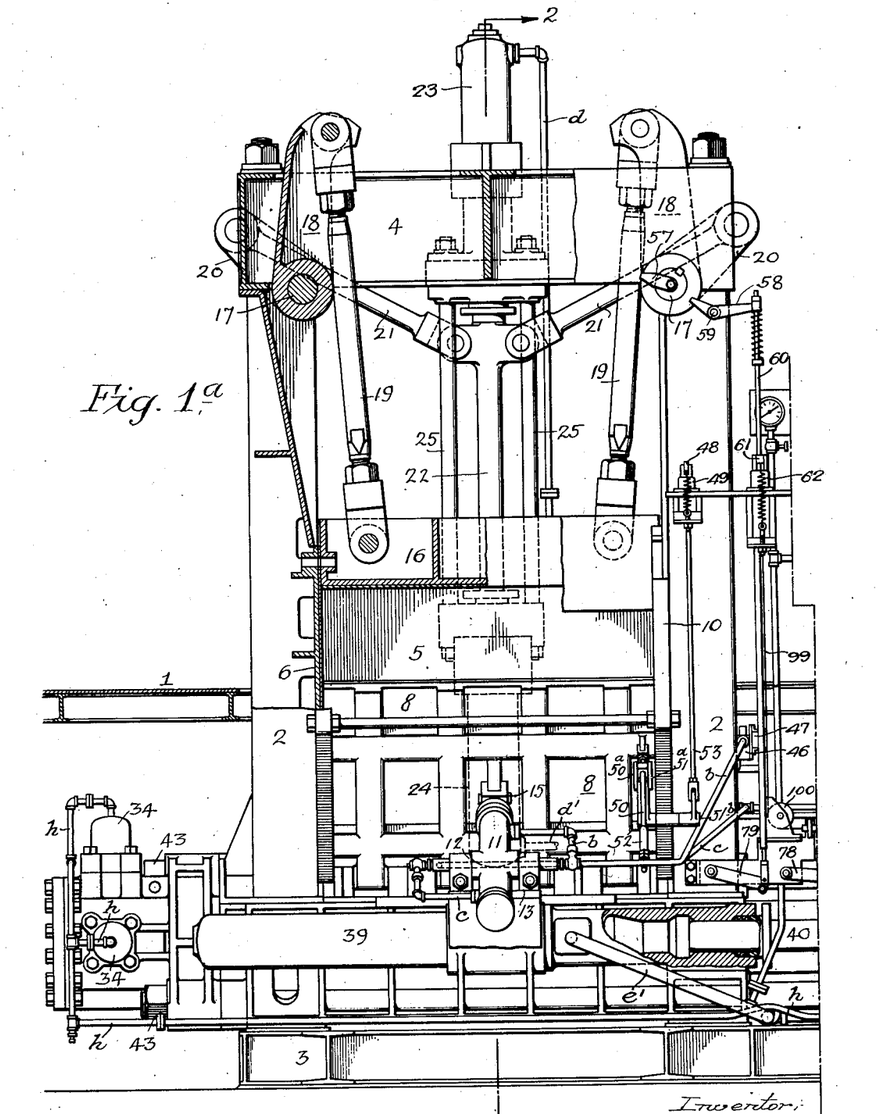
Fig. 1a is a view in elevation of my improved baling press, showing parts in section to more clearly illustrate the construction.
Figure 2:
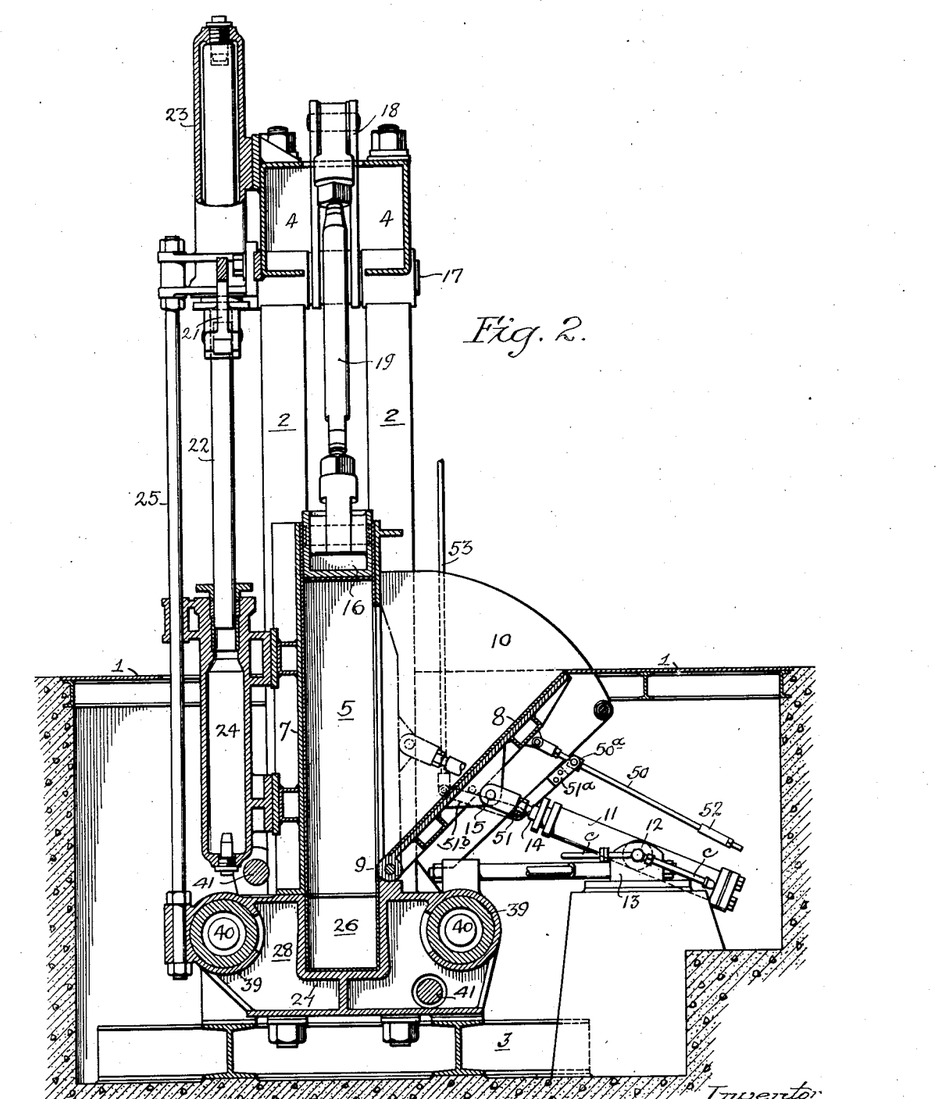

Referring in the first instance to Fig. 1a, 1 is the floor of the building in which the press is located. 2—2 are standards mounted on a foundation 3 of any suitable design, and these standards are connected at the top by a heavy crossbeam 4—4. Between the two standards is a primary chamber 5, formed by side members 6 and a back member 7, Fig. 2. This primary chamber 5 is rectangular in cross section. The front of the chamber is open to receive the scrap to be baled and the opening is closed by a door 8, which is hinged at 9. At each side of the door are plates 10 which act with the door when in the open position, as a hopper into which the scrap is discharged, preferably from a bucket carried by a crane, as it will be understood that the scrap is received at the baling press in cars which are discharged at one side of the track and form piles of scrap, and the scrap is taken from these piles by any suitable grab bucket, and carried to the press and discharged into the hopper formed by the door 8 and sides 10. The door is opened and closed by hydraulic mechanism in the present instance, consisting of a cylinder 11 having trunnions 12 mounted in bearings 13, Fig. 2. The piston rod 14 is pivotally connected to the door 8 by a pin 15. A suitable valve mechanism is provided for controlling the movement of the piston within the cylinder to open and close the door. When the door is closed it forms one wall of the primary chamber and the scrap is forced into the chamber as this door closes.

The chamber 5 communicates with a secondary chamber 26, which is a horizontal chamber. The masses of scrap within the primary chamber are compressed by a vertical movement of a plunger descending until it is at the upper edge of the transverse secondary chamber 26. When at this point the movement of the plunger stops and the plunger forms a portion of the upper wall of the chamber 6, as shown clearly in Fig. 4.

In the present instance the plunger 16 is actuated by two driven shafts 17 mounted in bearings in the cross beam 4, Fig. 1a, and on each shaft is an arm 18 which is connected to the plunger 16 by rods 19. The rods are adjustable to bring the lower portion of the plunger in alignment with the upper portion of the secondary chamber so as to form a portion of the upper wall of said chamber. On each shaft 17 is an arm 20 connected by links 21 to a plunger 22 of a double hydraulic ram. The upper end of the plunger 22 extends into an upper hydraulic cylinder 23 and the lower end extends into a lower hydraulic cylinder 24. The upper cylinder is connected rigidly to the top cross beam, while the lower cylinder is connected flexibly to the back member of the primary chamber with rod 25 as a stanchion. Suitable valve mechanism described hereinafter allows the fluid to pass into either of the cylinders. The upper cylinder is the compression cylinder, the fluid in which moves the mechanism to force the plunger 16 downwards to compress the material in the primary chamber to form the initial bale y. The cylinder 24 is the pull back cylinder. The fluid in this cylinder retracts the main plunger 16 after the bale is formed.

Figure 4:
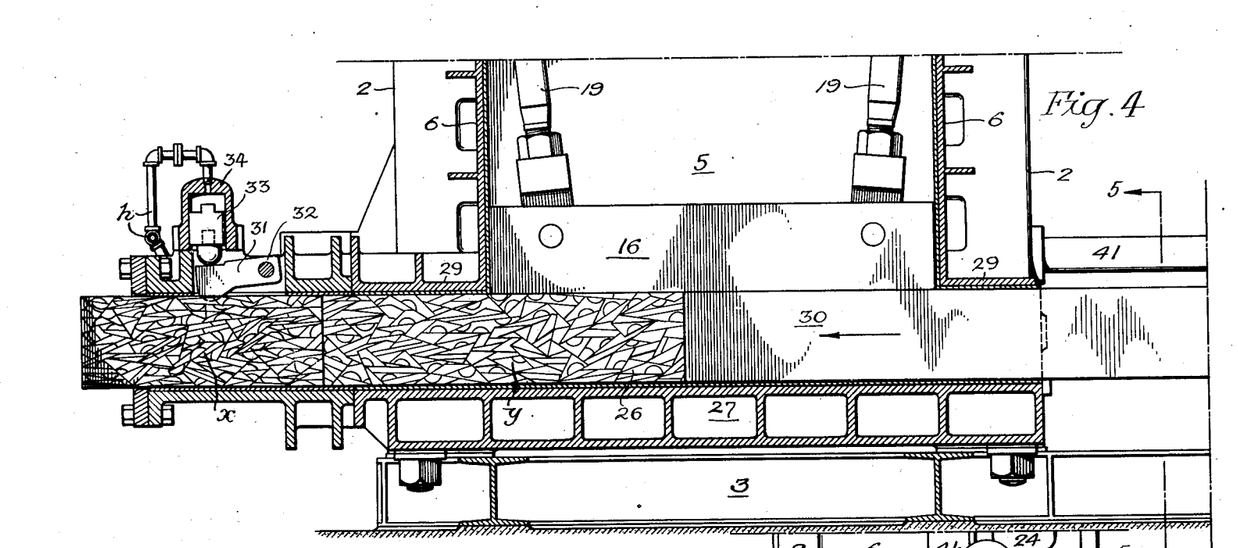
Fig. 4 is an enlarged sectional elevation showing the vertically moving plunger in the lowest position and forming part of the upper wall of the final compression chamber and the horizontal plunger moving to compress the scrap into a bale, the previously formed bale acting as an abutment for the bale being formed.
Figure 5:
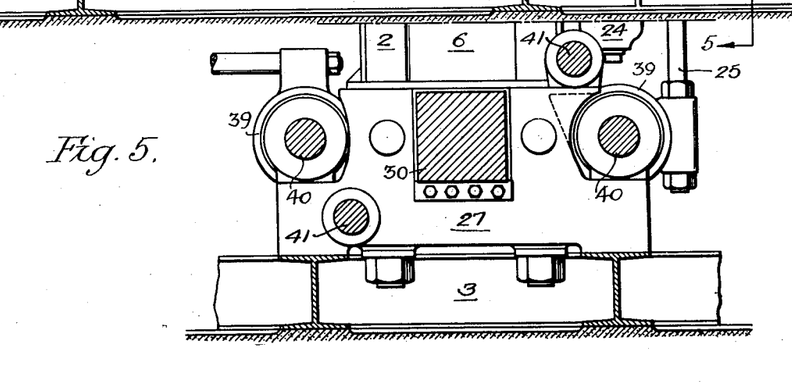
Fig. 5 is a sectional view on the line 5—5, Fig. 4.

The secondary chamber 26, which as stated above, is a horizontal chamber and rectangular in cross-section in the present instance. The lower wall 27 of this chamber, as well as the side walls 28, extend the full length of the chamber, while the upper wall 29 is discontinued at the primary chamber 5, and the plunger 16 in the primary chambers forms a continuation of the upper wall 29, so that when the plunger 16 is in its lowest position, as shown in Fig. 4, a rectangular compression chamber is formed.

30 is the plunger, which travels in the compression chamber 26 and compresses the loose scraps against the bale x of compressed scrap at the discharge end of the secondary chamber. The plunger 30 is rectangular in cross-section, in the present instance, to conform to the shape of the compression chamber 26.

At the discharge end of the chamber are clamps 31, pivoted at 32 to the frame of the machine, and these clamps have rounded ends which penetrate the formed bale x to a sufficient extent to firmly hold the formed bale while acting as an abutment for the bale y being formed by the horizontal movement of the plunger 30. The clamps are moved into gripping position by plungers 33 in cylinders 34. Water is admitted under pressure through a suitable valve to the inner end of the cylinder, causing the plungers 33 to force their clamps 31 into the formed bale x.

When the plunger 30 reaches a position in which the bale y is compressed to the desired extent, then the hydraulic valve controlling the water to the cylinders 34 is actuated, so as to release the water in said cylinders, and as the movement of the plunger 30 continues, when the bale y being formed has been compressed to the desired compactness, it commences to move the previously formed bale x, and this movement causes the clamps 31 to be moved clear of the formed bale x, allowing it to be discharged from the end of the machine.

Figure 6:
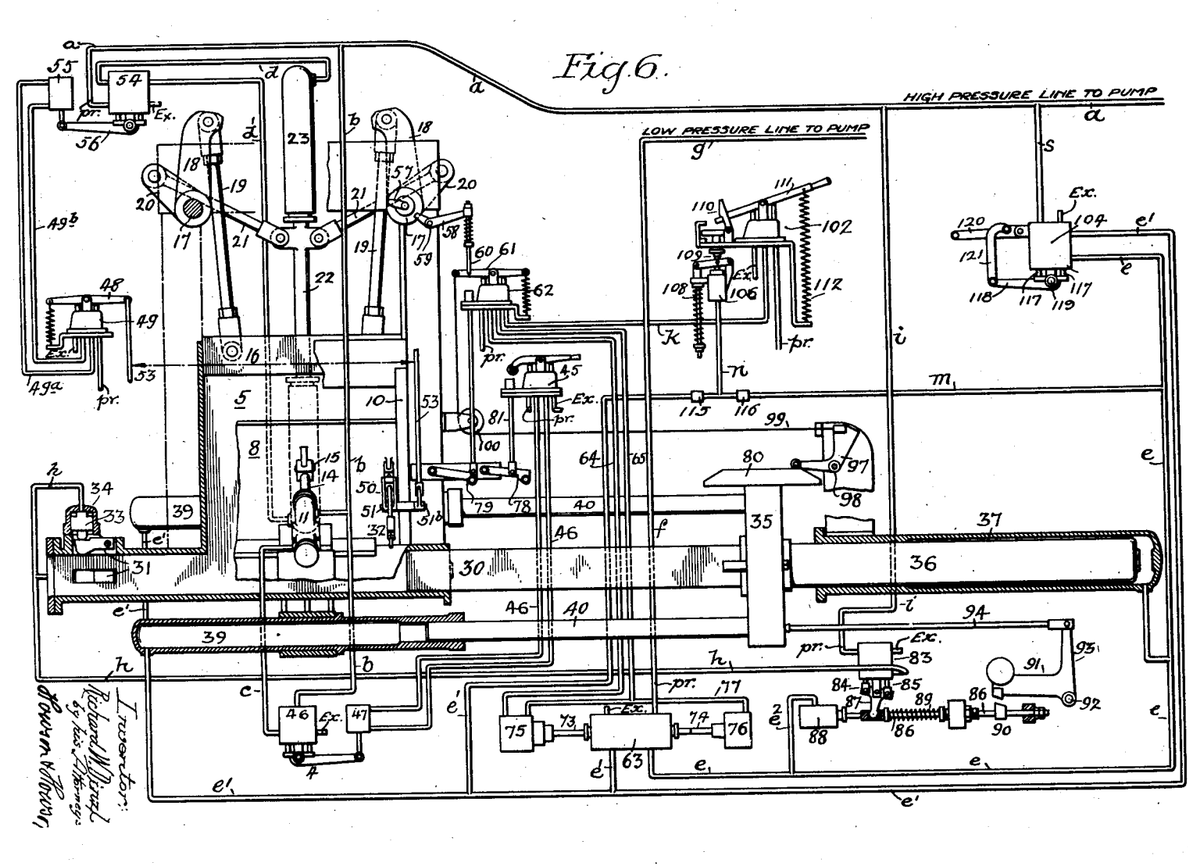
Fig. 6 is a diagram showing the press and the different valves for actuating the mechanisms of the press in succession.

The bale y, which has been compressed to the desired extent, takes the place of the bale x, and water is admitted to the cylinders 34, which causes the clamps 31 to penetrate the newly formed bale y and hold it while another bale is being formed, so that the newly formed bale y acts as an abutment for another batch of scrap as it is being compressed into the form of a bale by the plunger 30. In the present instance the plunger 30 is connected to a cross-head 35 and to a ram 36 in a cylinder 37, the rear end of the cylinder 37 being connected by a low pressure line from a pump through a valve 63. The ram after moving forward and compressing the bale, is retracted by water in pull-back cylinders 39 of the ordinary type, in which are rams 40 which are connected to the cross-head 35, as shown in Fig. 6. These pull-back cylinders are controlled by suitable valves described hereinafter.

Figures 1B, 3:
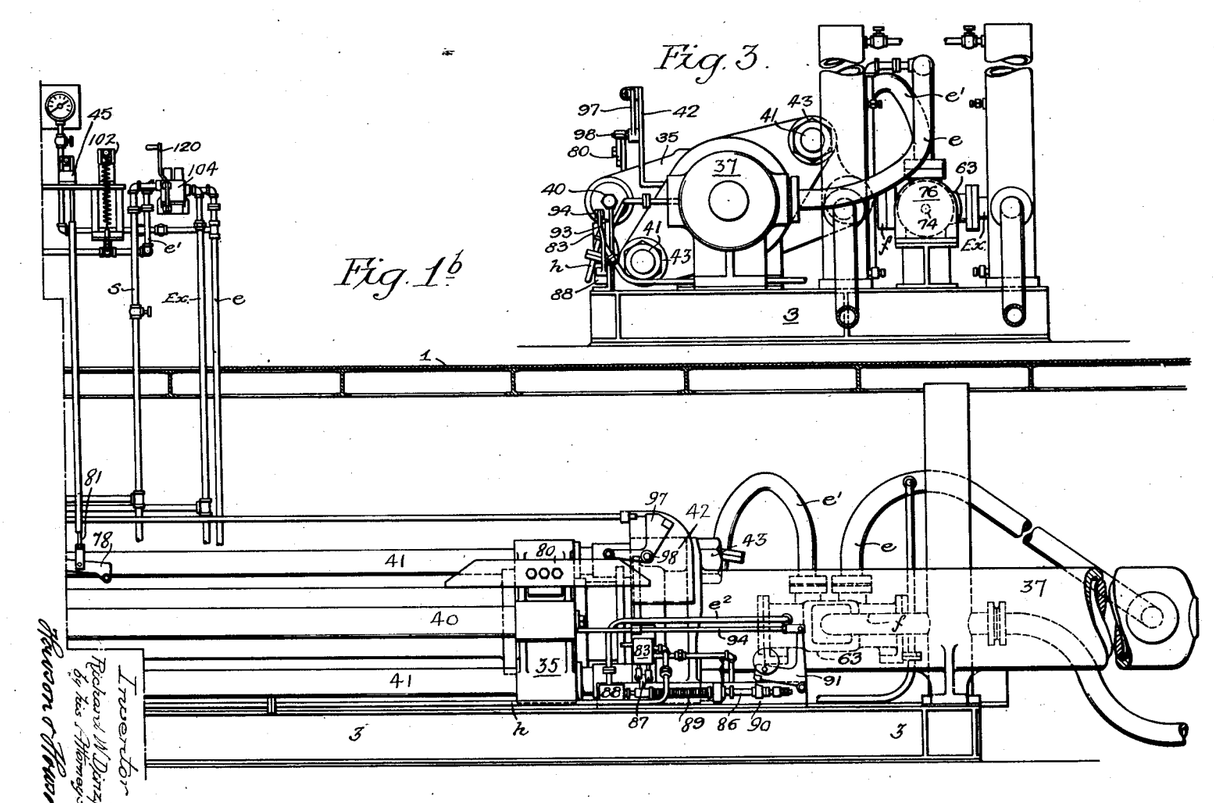
Fig. 1b is a continuation of Fig. 1a, showing the cylinder, piston and the mechanism connected therewith for operating the horizontal plunger.
Fig. 3 is a right hand end view of the machine shown in Fig. 1b.

Long tie-rods 41 connect the outer end 42 of the cylinder 37 with the main frame of the machine, the rods extending the full length of the main frame and having nuts 43 at their outer ends. The foundation frame 3 extends under the main structure of the machine and under a portion of the horizontal cylinder 37, and supports said cylinder as shown in Figure 1b.

The above-described mechanism forms no part of my invention, as this mechanism has heretofore been operated by independent hand-controlled valves, which necessitated the employment of a number of men who would actuate the valves at the proper moment so as to prevent jamming of the parts, and in some instances causing certain of the parts to be out of time with other parts. The prior operation of this mechanism was very slow and inaccurate. By my invention the one hand-operated valve is used and the several mechanisms, as they complete their movements, automatically actuate valves in time so that the bale is automatically formed after the first hand-operated valve is actuated.

The complete cycle of movement starts with the opening of the door of the primary compression chamber onto which the charge of tin scrap is dropped, and the door is then immediately closed, and the closing of the door operates valves to automatically move the compression plunger in the primary compression chamber to compress the scrap therein to form the initial bale. The plunger forces the partially completed bale into the secondary forming chamber, and the lower end of the plunger forms part of the top of this chamber. At this point valve mechanism is actuated to allow fluid to enter the cylinder 37, which moves the horizontal plunger forward to compress the bale against a previously formed bale which acts as an abutment, the previously formed bale being rigidly held by clamps which are not released until the bale being formed has been compressed to the proper extent, after which the clamps are automatically released by a valve, and after the horizontal plunger moves forward the first bale is pushed out of the machine by the second bale just formed, and this second bale takes the place of the first bale and the clamps are forced into this bale and are rigidly held there while another bale is being formed. The valves in the meantime are actuated when the plunger has reached a certain point in its stroke, allowing the escape of fluid from the cylinder 37, and the pull-back plungers retract the main plunger.

I will now describe the different valves which are used in carrying out my invention, by which on the movement of a single hand-operated valve to start the mechanism, the cycle of movement will be automatic and continued until a bale is formed and the door opened to receive another charge of scrap.

Figure 7:
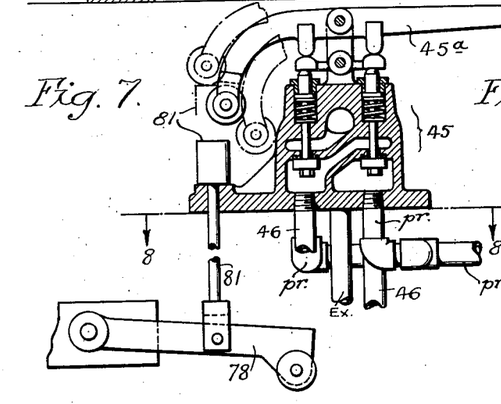
Fig. 7 is a view partly in section showing the hand-operated valve for starting the series of operations to form the bale.
Figure 8:
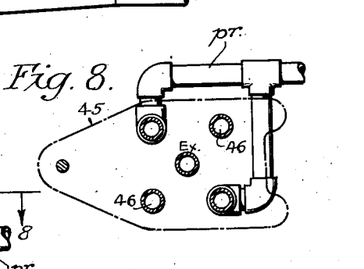
Fig. 8 is a sectional view on the line 8—8, Fig. 7.
Figures 9, 10:
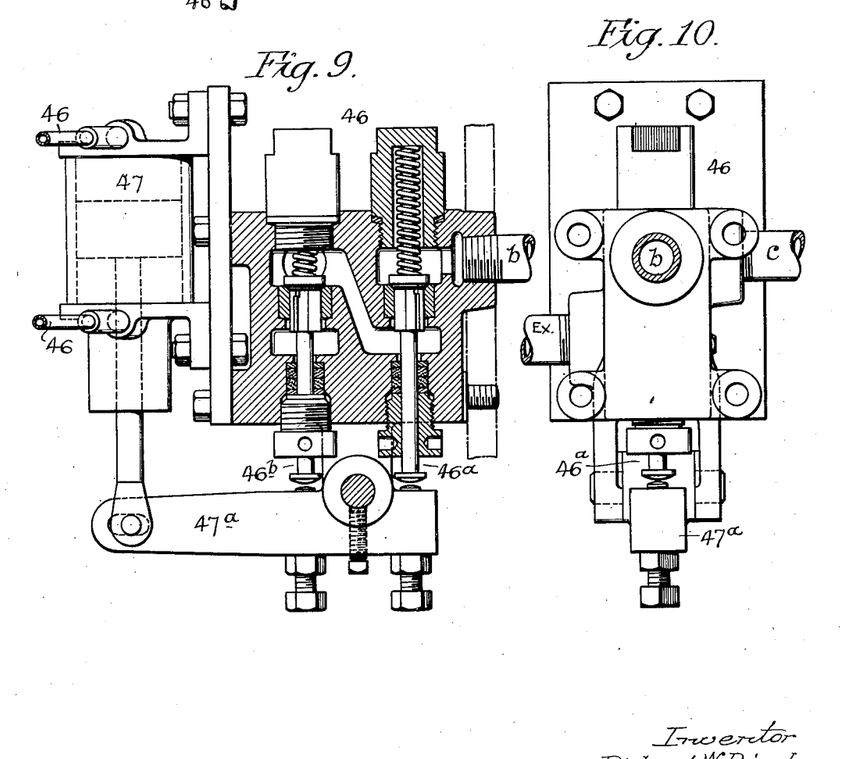
Fig. 9 is a sectional elevation of the three-way poppet valve and its air cylinder for controlling the movement of the door.
Fig. 10 is a side view of the valve.
Figure 11:
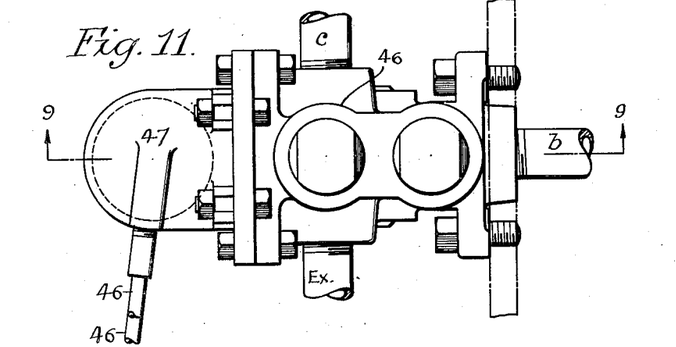
Fig. 11 is a plan view of the valve and air cylinder.

Referring to Figs. 7 and 8, 45 is the main hand-operated air valve, which starts the cycle of the operations of the machine. This air valve may be of any standard type and controls the three-way hydraulic poppet valve 46, Figs. 9, 10 and 11, through an air cylinder 47. The air cylinder 47 is connected to the valve 45 by pipes 46. The piston of the air cylinder 47 is connected to a lever 47a, which actuates the poppets 46a and 46b in the valve 46, which control the fluid through said valve.

The high pressure hydraulic main $a$ is connected to the valve 46 through a pipe $b$ and the door cylinder 11 is connected to the valve by a pipe $c$. When the fluid under pressure is admitted to the cylinder 11 the ram 14 in the cylinder 11 closes the door 8. The door when nearly closed will throw the lever 48 of the four-way valve 49 through the medium of the rod 50. The rod 50 is pivotally connected to the door 8, and passes through a block 50a swivelled on an arm 51a on a shaft 51. On the rod 50 is an abutment 52, which strikes the arm 51a as the door closes, and this movement turns the shaft 51. On the shaft is an arm 51b, which is connected by a rod 53 to the lever 48 of the four-way air valve 49. The valve 49 is connected by pipes 49a and 49b to an air cylinder 55, the piston in which is connected to the lever 56 which actuates the poppets in the four-way hydraulic valve 54. This valve is connected to the upper end of the vertical cylinder 23 through a pipe $d$, and to the lower end of the cylinder 24 by a pipe $d'$, and is also connected to the hydraulic main $a$. When the door is closed the above-described mechanism will admit fluid under high pressure to the cylinder 23 and force the plunger 22 downwards, and this movement will actuate the plunger 16 of the press, compressing the material in the primary chamber 5 and forcing it into the secondary chamber 26. When the plunger 16 nears the bottom of the stroke an arm 57 on one of the driven shafts 17 strikes an arm of a lever 58 pivoted at 59 to the frame of the machine. The other arm of this lever is yieldingly connected to a rod 60, which is connected to a lever 61 of the air valve 62, which controls the four-way hydraulic valve 63 through the pipes 64 and 65, which are connected to air cylinders 75 and 76, shown in the diagram, Fig. 6. The valve 63 is shown in detail in Figs. 13 and 14, and consists of a valve casing 66 in which is a hollow valve 67 having passages which communicate with the ports 68 and 69. The port 68 communicates with the pipe $e$ leading to the main horizontal cylinder 37, and the port 69 communicates with the pipe $e'$ leading to the pull-back cylinder 39. $f$ is an inlet pipe connected to the low pressure line $g$. In each end of the casing are exhaust ports 72. The valve rods 73 and 74 of the valve 67 extend into the cylinders 75 and 76, respectively, Fig. 13, in which are pistons which are secured to the valve stems. The forward end of the cylinder 75 and the rear end of the cylinder 76 are connected to a pipe 77, which in turn communicates with the pipe 65 leading from the valve 62. The pipe 64 mentioned above, communicates with the return end of the cylinder 75, so that when the valve 62 is actuated in one direction, air actuates the piston 75, which moves the valve 67 in one direction, and when the valve 62 is moved in the opposite direction the movement of the valve 67 is reversed.

Figure 13:
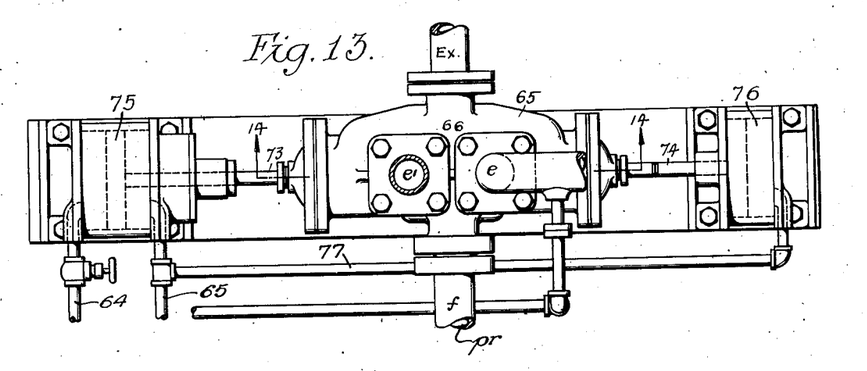
Fig. 13 is a plan view of the valve and its air cylinders for controlling the movement of the horizontal plunger in the secondary or final compression chamber.
Figure 14:
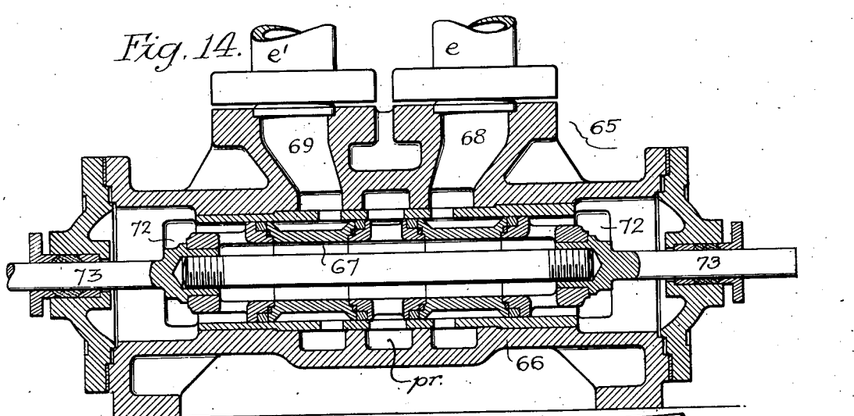
Fig. 14 is an enlarged sectional view of the valve shown in Fig. 13.
Figure 15:
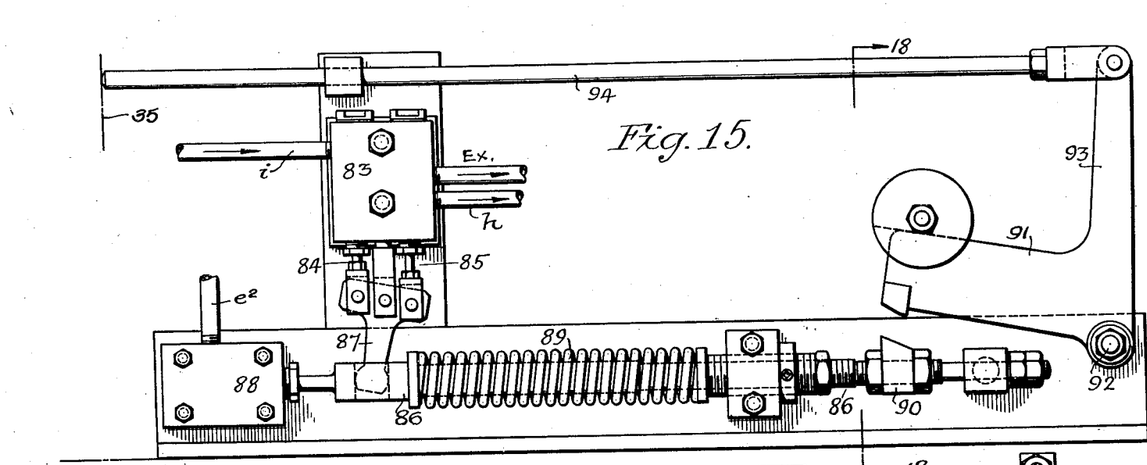
Fig. 15 is a side view of the mechanism for operating the clamps which engage a formed bale at the end of the final compression chamber.
Figures 16, 18:
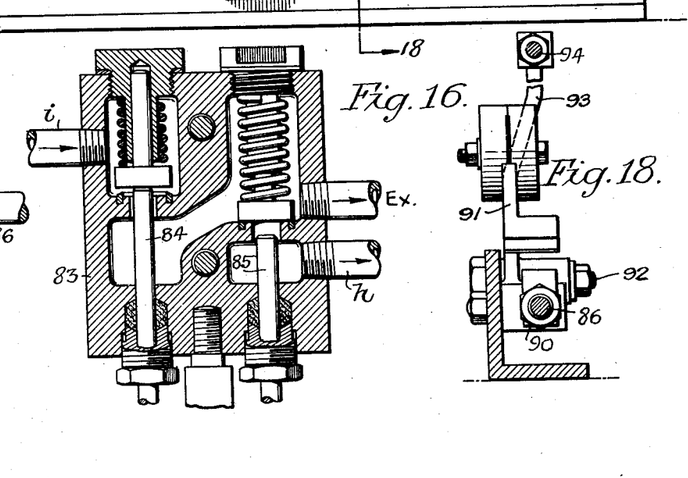
Fig. 16 is a sectional view of the valve mechanism shown in Fig. 15.
Fig. 18 is a sectional view on the line 18—18, Fig. 15.
Figure 17:
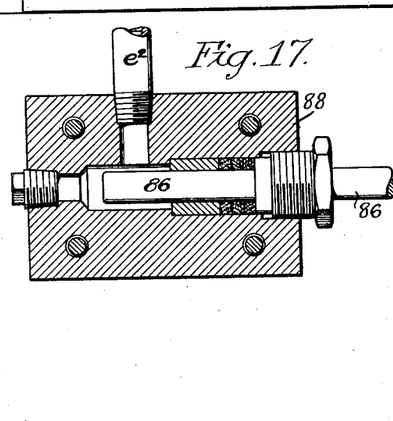
Fig. 17 is a sectional view of the hydraulic cylinder shown in Fig. 15.

While I have illustrated in Figs. 13 and 14 a particular form of valve for accomplishing the work, the valve may be modified without departing from the essential feature of the invention.

It will be understood that the valve 63 will apply low pressure to the main horizontal cylinder, moving the ram 36 and its plunger 30 forward, the plunger compressing the bale to its final shape.

78 and 79 are two cam levers which ride upon the cam plate 80 attached to the head 35 of the ram 36 when the plunger 30 is about completing its forward compressing movement. The cam lever 78 is located in advance of the cam lever 79 and is the first to ride upon the cam plate 80 as it moves forward. This lever 78 is connected to a rod 81, which is elevated by the cam plate 80 and strikes the operating lever 45a of the main manually operated air valve 45, reversing the valve, and this valve reverses the three-way poppet valve 46, allowing the door 8 to open to receive another charge of scrap as the forward end of the cylinder is connected to the pressure pipe $b$. As the door is moving to the open position it releases the air valve 49, which reverses the four-way poppet valve 54, which exhausts pressure in the cylinder 23, and fluid passes through the pipe $d'$ to the pull-back cylinder 24 to return the ram 22 to its starting position, exhausting cylinder 23. This movement elevates the plunger 16 so that the primary chamber 5 can receive another charge of scrap through the opening in the side normally closed by the door 8.

While the bale $y$ in the horizontal chamber 26 is being compressed, the pressure in the main horizontal cylinder 37 rises. As the plunger 30 continues its forward movement the cam plate 80 elevates the second cam lever 79, which engages the lever 61 and reverses the air valve 62, which in turn reverses the four-way valve 63, throwing the main horizontal cylinder 37 on exhaust, and pressure into the pull-back cylinders 39. The horizontal plunger 30 then returns to its first position. When the bale has been sufficiently compressed the clamps 31 are released as the pressure on the plungers 33 is withdrawn, as the pipe $h$, which communicates with the cylinders 34 extends to the clamping cylinder valve casing 83. The two poppets 84 and 85 in this casing 83 are actuated by a rod 86, through a lever 87. The valve casing 83 is connected by a pipe $i$ to the high pressure line $a$. The cylinder 88 is connected to pipe $e$ by a branch $e$—2, and the rod is moved in one direction by pressure in a cylinder 88 and when pressure is released a spring 89 returns the rod and lever 87 to their first position. On the rod 86 is a collar 90, onto which drops a weighted latch lever 91 pivoted at 92. An arm 93 of this lever is attached to a push rod 94, which is engaged by the head 35. As soon as the ram moves forward the lever 91 drops onto the collar 90 but does not engage it until the pressure in the cylinder 88 overcomes the resistance of the spring 89. Then the rod 86 is moved longitudinally, allowing the collar 90 to pass the latch lever 91, which then drops and engages the collar. The movement of the rod operates the valves 84 and 85, and cuts off pressure to the clamp cylinders, opening them to exhaust. The ram 30 continues to move forward and as the bale $x$ is released by the clamps and is ejected, the bale $y$ just formed takes its place as an abutment. Upon the return of the ram 30 by the pressure in the pull back cylinder 39, the latch 91 is raised by the head 35, which pushes upon the rod 94 attached to the said latch 91. As soon as the latch is raised it disengages the collar 90 and releases the rod 88 and under pressure of the spring 89 returns the valve 83 to normal rest position and pressure is again maintained in the clamp cylinders 34, forcing the clamps 31 into the newly formed bale $y$. As the ram 30 returns to its first position the cam plate 80 actuates the bell crank lever 97, pivoted at 98. This lever 97 is connected to a cord 99 which passes around a sheave 100, and is attached to the lever 61 of the valve 62. The movement of the lever 97 shifts the valves in the valve casing 62 into a neutral position, which puts air pressure into both air cylinders 75 and 76 of the four-way valve 63, moving the latter into neutral position. In this position both main cylinders and the pull-back cylinders are locked and the low pressure pump through the pipe $f$ is by-passing through the valve 63.

In the event of pressure building up excessively before the plunger 30 reaches the end of its forward stroke, the air valve 102 will be thrown by the cylinder 106, pushing the four-way valve 62 through the pipe $k$ into neutral position, and the plunger will stop at this point. The cylinder 106 is connected to the low pressure mains $e-e-1$ through a branch pipe $n$ and through a pipe $m$.

The valve 102 is a three-way poppet valve of the self-locking type. It has two positions during the operation of the machine. The valve has three ports, namely pressure, exhaust and a pipe connection $k$ with the valve 62. When air is exhausted from the control cylinders 75 and 76 it is passed through the valve 62 and then through the valve 102, which during the normal operation of the machine, communicate this exhaust to atmosphere.

As long as the pressure in the compression cylinder 37 is normal the valve 102 will continue to hold the exhaust passage open, as its lever 111 is held by a latch 110 controlled by the cylinder 106. Should the pressure in the horizontal compression cylinder 37 build up excessively, this pressure in the cylinder 106 will trip the latch and return the lever 111, and a spring 112 will shift the lever to the other operative position. Immediately air pressure will enter valve 102 to valve 62. Consequently during any movement of the ram 30, the valve 62 is simultaneously supplying air and exhausting pressure from the respective control cylinders of the valve 63. It follows then that the pressure entering valve 102 passes through the exhaust connection of valve 62, causing pressure to be supplied to whichever control cylinder 75 or 76 of valve 63 is exhausting at that time.

The valve 104 may now be manually operated to overcome the resistance in the compression chamber 26, or push back cylinders.

As the cylinder 106 is connected to both the push back cylinders 39 and the compression cylinder 37, slow leak fittings 115 and 116 are provided in the pressure line $m$ on each side of the connection $n$ to the cylinder 106. These fittings prevent the pressure in the cylinder 37 and pull-back cylinders 39 from equalizing, and permit pressure in either cylinder to operate the valve 102 independently of the other.

The valve 104 is a four-way valve and is manually operated to supply high pressure to either the cylinder 37 or the pull-back cylinder 39, overcoming an abnormal resistance to the moving parts associated therewith during the operation of the press.

Figures 12, 19:
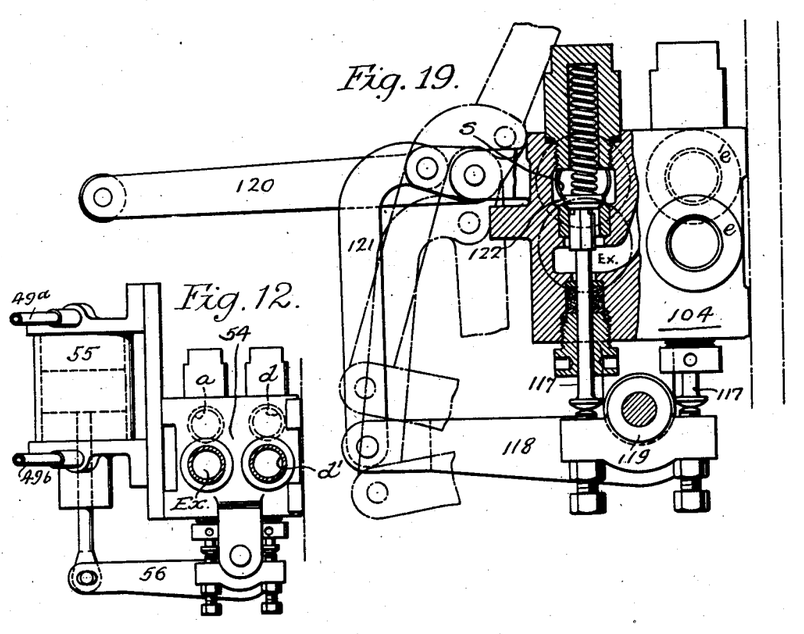
Fig. 12 is a side view of the four-way poppet valve and its air cylinder for controlling the movement of the plunger in the primary compression chamber.
Fig. 19 is a view in elevation of the high pressure four-way poppet valve, partly in section.
Figure 20:
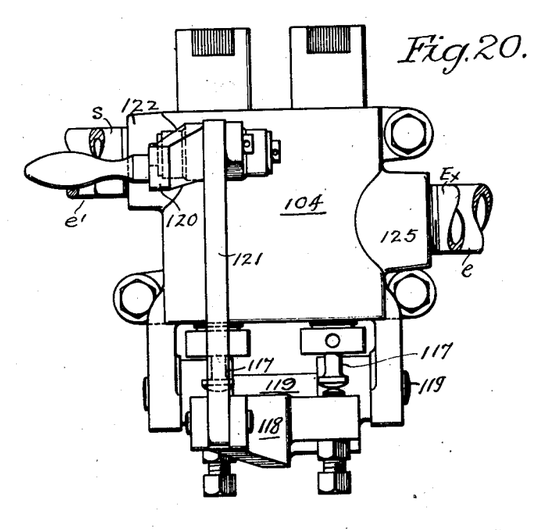
Fig. 20 is an end view of the valve shown in Fig. 19.
Figures 21, 22:
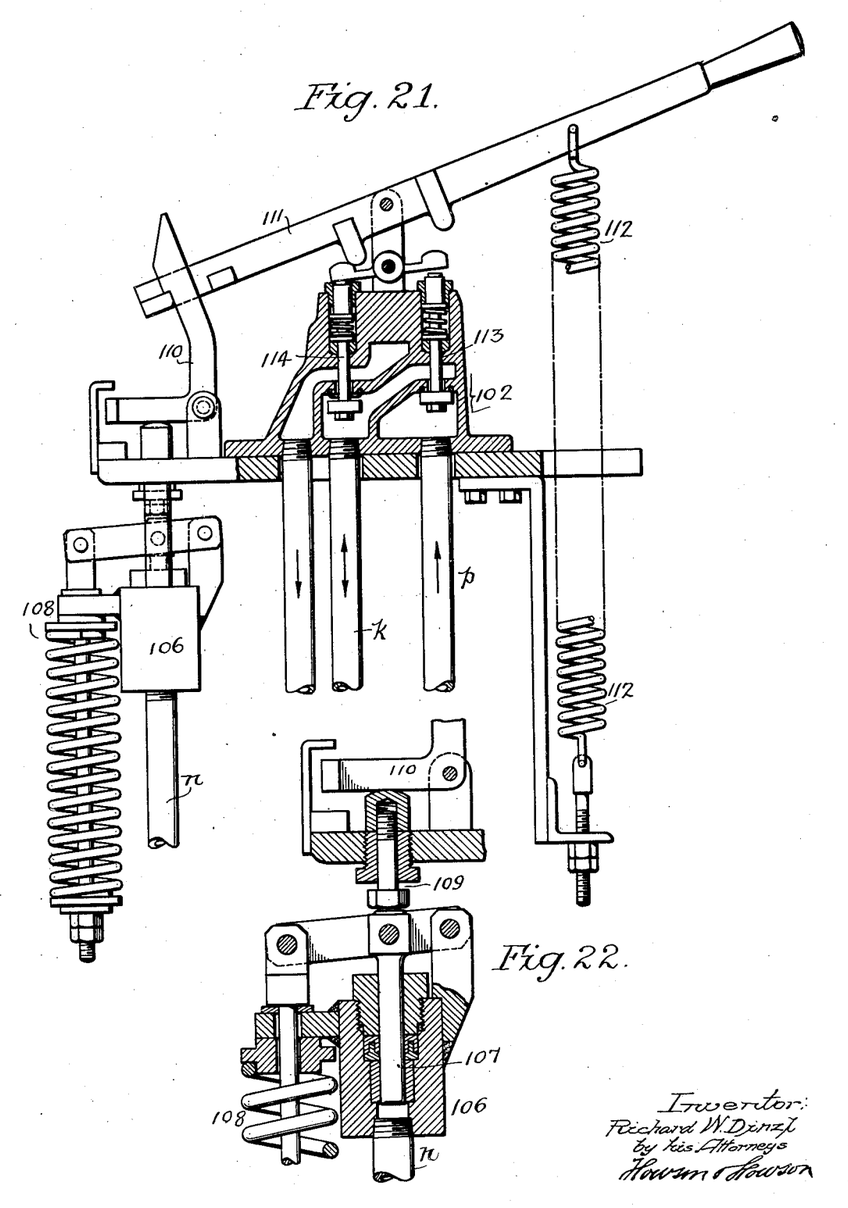
Fig. 21 is a side view partly in section of the excessive pressure valve.
Fig. 22 is a sectional view of the hydraulic cylinder for actuating the trip mechanism which engages the lever of the excessive pressure valve.

Referring to Figs. 19 and 20, the valve 104 has four poppets 117 actuated by a lever 118 pivoted at 119. The lever is connected to a hand lever 120 by a link 121. In the valve casing is a high pressure inlet port 122, which is connected to the high pressure line $a$ by a pipe S and to ports 123 and 124, connected to the pipe $e$, $e'$, respectively, and an exhaust port 125.

As soon as water is admitted to the cylinder 106 the plunger 107 is elevated against the pressure of the spring 108 and the plunger strikes the plunger 109, which throws the latch 110, releasing the hand lever 111. The spring 112 moves the lever to the reverse position and shifts the poppet 113 to the open position, and the poppet 114 automatically closes so that air pressure passes through the pipe $k$, through the open ports in valve 62 and to cylinders 75 and 76, throwing the valve 63 to a neutral position. By passing the pump, plunger 36 will stop in its movement.

The lever 111 can be manually operated if it is desired to stop the machine at any time.

I claim:

1. The combination in a baling press, of a primary baling chamber; a secondary baling chamber; a plunger in the primary baling chamber for compressing the bale in one direction; a ram in the secondary chamber for compressing the bale into final form and at right angles to the first-mentioned pressure, said primary chamber having a side member which forms a chute for the material to be baled; means for retaining the previously formed bale as an abutment against which the bale is finally compressed; a hand-operated valve and automatic hydraulic valves controlling the several mechanisms of the press; air valves for shifting the hydraulic valves; and means for automatically operating the several air valves after the primary hand valve is moved, so that the cycle of movement will be continuous until a bale is formed and in position to act as an abutment for another bale to be formed, the mechanism automatically stopping when the bale is in the position to act as an abutment.

2. The combination in a baling press, of a vertical primary baling chamber; a horizontal secondary baling chamber connected to the vertical chamber; a plunger in the vertical chamber for initially compressing the material; and a plunger in the horizontal chamber for compressing the material into final form; means for locking a previously formed bale to act as an abutment for the bale being formed; mechanisms for operating the two plungers; a hand-controlled air valve; and a series of air valves and hydraulic valves acting in series to actuate the mechanisms of the press in a complete cycle until a bale is formed and moved to a position to act as an abutment for a succeeding bale.

3. The combination in a baling press, of a vertical primary chamber; a secondary chamber connected to the primary chamber; a plunger in the vertical primary chamber acting to initially compress the material, said plunger forming a portion of the top wall of the secondary chamber when in its lowest position; a door forming one side of the primary chamber and also acting when open as a chute for material to be compressed; a reciprocating horizontal plunger arranged to compress the material in the secondary chamber; hydraulic mechanism for actuating the last-mentioned plunger; a primary hand-operated air valve; an air cylinder to which the primary valve is connected; a hydraulic valve controlled by the air in the air cylinder; a cylinder connected to the hydraulic valve; a piston in said cylinder connected to the door for a hydraulic valve opening and closing said door through the piston and cylinder; mechanism controlled by the door for operating a four-way air valve; an air cylinder connected to the air valve; a four-way poppet valve actuated by the air in the air cylinder, said poppet valve being connected to the upper and lower cylinders; a plunger extending into both cylinders; connecting mechanism between the plunger of the air cylinders and the plunger of the primary compression chamber controlled by the four-way poppet valve; an air valve; actuating means for the air valve connected to the means for operating the plunger in the initial chamber; a hydraulic valve; air cylinders connected thereto and to the last-mentioned air valve; a horizontal hydraulic cylinder; and a ram in said cylinder connected to the horizontal plunger of the final compression chamber, the last-mentioned hydraulic valve controlling the movement of the ram.

4. The combination in a press for baling tin scrap and like material, of a vertical primary chamber; a horizontal secondary chamber for compressing the bale into final form; means at the discharge end of the chamber for locking a previously formed bale which acts as an abutment for the bale being formed; a pivotally mounted door acting as a chute for the material when in the open position and when closed forming one wall of the primary chamber; a cylinder; a piston in said cylinder connected to the door; a hand-operated air valve; a hydraulic valve connected to both ends of the door operating cylinder; an air cylinder for actuating the hydraulic valve and connected to the first-mentioned hand-operated air cylinder; a reciprocating plunger in the primary compression chamber; two vertical cylinders; a plunger adapted to both cylinders; connections between said plunger and the compression plunger of the primary compression chamber; a four-way air valve; mechanism actuated by the door controlling the movement of said valve; a four-way hydraulic valve; an air valve controlling the said hydraulic valve and connected to the four-way air valve actuated by the door, the connections between the four-way hydraulic valve and the two vertical cylinders for moving the plunger of said cylinders; a four-way valve actuated by the mechanism between the plunger of the cylinders and the compression plunger of the primary compression chamber; two air cylinders connected to the last-mentioned air valve; a hydraulic valve controlled by the air in said cylinders; a compression cylinder; a ram in said cylinder; a plunger connected to the ram for compressing the material in the secondary compression chamber; a pipe leading from the last-mentioned hydraulic valve to the rear end of the compression cylinder; means for actuating the initial hand-operated valve and the valve controlling the last-mentioned hydraulic cylinder when the plunger in the secondary chamber nears the end of its stroke; and means for returning the last-mentioned air valve to its normal position when the horizontal plunger returns to its initial position.

5. The combination in a press for baling tin scrap and like material, of a vertical primary chamber; a horizontal secondary chamber for compressing the bale into final form; means at the discharge end of the chamber for locking a previously formed bale which acts as an abutment for the bale being formed; a pivotally mounted door acting as a chute for the material when in the open position and when closed forming one wall of the primary chamber; a cylinder; a piston in said cylinder connected to the door; a hand-operated air valve; a hydraulic valve connected to both ends of the door operating cylinder; an air cylinder for actuating the hydraulic valve and connected to the first-mentioned hand-operated air cylinder; a reciprocating plunger in the primary compression chamber; two vertical cylinders; a plunger adapted to both cylinders; connections between said plunger and the compression plunger of the primary compression chamber; a four-way air valve; mechanism actuated by the door controlling the movement of said valve; a four-way hydraulic valve; an air valve controlling the said hydraulic valve and connected to the four-way air valve actuated by the door, the connections between the four-way hydraulic valve and the two vertical cylinders for moving the plunger of said cylinders; a four-way valve actuated by the mechanism between the plunger of the cylinder and the compression plunger of the primary compression chamber; two air cylinders connected to the last-mentioned air valve; a hydraulic valve controlled by the air in said cylinders; a compression cylinder; a ram in said cylinder; a plunger connected to the ram for compressing the material in the secondary compression chamber; a pipe leading from the last-mentioned hydraulic valve to the rear end of the compression cylinder; means for actuating the initial hand-operated valve and the valve controlling the last-mentioned hydraulic cylinder when the plunger in the secondary chamber nears the end of its stroke; and means for returning the last-mentioned air valve to its normal position when the horizontal plunger returns to its initial position; means at the end of the horizontal compression chamber for gripping a previously formed bale which acts as an abutment for the bale being formed; and mechanism for controlling the gripping means actuated by the ram of the horizontal cylinder and by a cylinder connected to the hydraulic valve which controls the movement of the ram.

6. The combination in a baling press, of a primary baling chamber; a secondary baling chamber connected to the primary chamber; a plunger in the primary chamber for initially compressing the material; a plunger in the secondary chamber for compressing the material into final form; means for locking a previously formed bale at the discharge end of the secondary chamber to act as an abutment for the bale being formed; means for operating the plunger in the primary chamber; means controlled by said plunger operating means for actuating the plunger in the secondary chamber; and means controlled by said last mentioned means for releasing said locking means to permit discharge of the previously formed bale.

7. The combination in a baling press, of a primary baling chamber; a secondary baling chamber into which a partly formed bale is discharged from the primary baling chamber; a plunger in the primary baling chamber for compressing the bale in one direction; a ram in the secondary baling chamber for compressing the bale into final form and at right angles to the first-mentioned pressure, said primary chamber having a side member which when moved outwards forms a chute for the material to be baled; means at the discharge end of the secondary baling chamber for retaining a previously formed bale as an abutment against which the bale being formed is finally compressed; a hand-operated valve for operating the side member of the primary chamber; valve mechanism for controlling the movement of the plunger in the primary chamber; means controlled by said side member for actuating the valve mechanism controlling the movement of the plunger; valve mechanism for controlling the movement of the ram in the secondary baling chamber; means actuated by the plunger mechanism of the primary chamber for actuating the valve mechanism controlling the ram; and valve mechanism controlling the means for retaining a previously formed bale at the discharge end of the secondary baling chamber.

RICHARD W. DINZL.